(12) United States Patent
Morselli et al.

(10) Patent No.: US 8,451,139 B2
(45) Date of Patent: May 28, 2013

(54) SYSTEM AND METHOD FOR COORDINATING HARVESTER AND TRANSPORT VEHICLE UNLOADING OPERATIONS

(75) Inventors: Riccardo Morselli, San Vito, MO (US);
John Posselius, Ephrata, PA (US);
Christopher A. Foster, Denver, PA (US)

(73) Assignee: CNH America LLC, New Holland, PA (US)

( * ) Notice: Subject to any disclaimer, the term of this patent is extended or adjusted under 35 U.S.C. 154(b) by 410 days.

(21) Appl. No.: 12/709,760

(22) Filed: Feb. 22, 2010

(65) Prior Publication Data
US 2011/0205084 A1    Aug. 25, 2011

(51) Int. Cl.
*G08G 1/00*    (2006.01)
(52) U.S. Cl.
USPC .............. 340/901; 340/988; 701/50; 348/148
(58) Field of Classification Search
USPC ..................... 340/901, 988; 701/50; 348/148, 348/120, 89; 56/473; 382/104
See application file for complete search history.

(56) References Cited

U.S. PATENT DOCUMENTS

| | | | |
|---|---|---|---|
| 5,749,783 A | 5/1998 | Pollklas | |
| 5,828,971 A | 10/1998 | Diekhans et al. | |
| 5,842,920 A | 12/1998 | Siepker | |
| 6,097,425 A | 8/2000 | Behnke et al. | |
| 6,101,795 A | 8/2000 | Diekhans | |
| 6,148,255 A | 11/2000 | Van Der Lely | |
| 6,203,111 B1 | 3/2001 | Ollis et al. | |
| 6,216,071 B1 | 4/2001 | Motz | |
| 6,332,108 B1 | 12/2001 | Hirasago | |
| 6,553,311 B2 | 4/2003 | Ahearn et al. | |
| 6,571,172 B1 | 5/2003 | Klement | |
| 6,587,772 B2 | 7/2003 | Behnke | |
| 6,591,875 B2 | 7/2003 | Zaun et al. | |
| 6,594,979 B2 | 7/2003 | Krone et al. | |
| 6,682,416 B2 | 1/2004 | Behnke et al. | |
| 6,943,824 B2 | 9/2005 | Alexia et al. | |
| 7,063,614 B2 | 6/2006 | Vogelgesang et al. | |
| 7,202,776 B2 | 4/2007 | Breed | |
| 7,277,784 B2 | 10/2007 | Weiss | |
| 2002/0103600 A1 | 8/2002 | Hirao | |
| 2003/0010004 A1* | 1/2003 | Krone et al. | ............... 56/10.2 G |
| 2005/0102089 A1 | 5/2005 | Linden | |
| 2005/0182551 A1 | 8/2005 | Sugano | |
| 2006/0150584 A1 | 7/2006 | Weiss | |
| 2006/0222207 A1 | 10/2006 | Blazer et al. | |
| 2007/0037621 A1 | 2/2007 | Isfort | |

(Continued)

FOREIGN PATENT DOCUMENTS

WO    WO2009115404 A1    9/2009

OTHER PUBLICATIONS

EP2361494, Reply to communication of the Examining Division of the EPO, Jul. 19, 2012.

*Primary Examiner* — Anh V La
(74) *Attorney, Agent, or Firm* — Patrick M. Sheldrake

(57) ABSTRACT

A system and method for positioning a transport vehicle relative to a harvester is disclosed. The system includes an imaging device mounted on the transport vehicle and a control system for analyzing image data and executing a computer program to provide commands to position the transport vehicle in an acceptable predetermined condition relative to the harvester for discharge operations.

19 Claims, 2 Drawing Sheets

U.S. PATENT DOCUMENTS

| | | |
|---|---|---|
| 2007/0165908 A1 | 7/2007 | Braeunl et al. |
| 2007/0182528 A1 | 8/2007 | Breed et al. |
| 2007/0294020 A1 | 12/2007 | Riegel |
| 2009/0044505 A1 | 2/2009 | Huster et al. |
| 2009/0306835 A1* | 12/2009 | Ellermann et al. ............... 701/2 |
| 2010/0108188 A1 | 5/2010 | Correns et al. |

* cited by examiner

SYSTEM AND METHOD FOR COORDINATING HARVESTER AND TRANSPORT VEHICLE UNLOADING OPERATIONS

FIELD OF THE INVENTION

The present invention relates generally to crop gathering devices and operations. It relates more particularly to a system and method for positioning a harvester and an offloading vehicle during harvester discharge.

BACKGROUND OF THE INVENTION

Harvesting machines pick up crop, treat the crop in a known manner, and discharge the crop. The harvesting machines discharge the crop, either continuously as with a forage harvester or after intermediate storage as with a combine harvester, to a transport vehicle. The transport vehicle may be a tractor or truck pulling a cart, wagon, or trailer, or a truck or other vehicle capable of harvested crop transport. The harvested crop is loaded into the transport vehicle via a crop discharging device, such as a spout or discharge auger, associated with the harvesting machine.

In a forage harvester, which requires the constant discharge of the harvested crop, the transport vehicle travels next to and/or behind the harvesting machine. It takes a certain level of skill and concentration to transfer the harvested crop from the harvester to the transport vehicle while both vehicles are moving. This problem is also present when transferring harvested crops from a combine harvester to a transport vehicle while both vehicles are moving, which is a common practice used to maximize the operating efficiency of the combine during harvest.

The harvesting machine and the transport vehicle are each controlled by an operator. The operator of the harvesting machine continuously monitors the harvesting process as well as monitoring and controlling the transfer process. The operator of the harvesting machine must also communicate instructions, including positioning instructions, to the operator of the transport vehicle by means of signals such as by hand signals, or flashing lights or via wireless link, such as radio or phone, for filling of the transport vehicle. This coordinated movement is particularly necessary when the transfer device has no or limited means for adjustment. However, this coordinated movement is difficult, and may not be sufficiently effective at the beginning of the discharge process, when the trajectory of the crop through the air cannot yet be estimated clearly by the vehicle operators.

The present disclosure is directed to overcoming one or more of the problems set forth above.

SUMMARY OF THE INVENTION

The present disclosure relates to a control system for positioning a transport vehicle relative to a harvester for discharge operations. The control system includes an imaging device for generating an image signal and a microprocessor for processing the image signal and generating position command data. The command data includes command instructions for an operator of the transport vehicle. The microprocessor includes a data base and a computer program product embodied on a computer readable medium. The microprocessor is configured to execute the computer program product to generate the position command data.

The present disclosure further relates to a transport vehicle for receiving a discharged crop from a harvester. The transport vehicle includes an imaging device for generating an image signal and a microprocessor for processing the image signal and generating position command data. The command data includes command instructions for an operator of the transport vehicle. The microprocessor includes a data base and a computer program product embodied on a computer readable medium. The microprocessor is configured to execute the computer program product to generate the position command data.

The present disclosure yet further relates to a method of positioning a transport vehicle and a harvester for unloading operations. The method includes generating a database of acceptable relative positions between the transport vehicle and the harvester, capturing video images of the relative position of the harvester, comparing the captured video images to the data base of acceptable relative positions, and generating position commands to position the transport vehicle in an acceptable relative position with the harvester for discharge operations.

One advantage of the present disclosure is to provide an improved system and method for positioning a transport vehicle relative to a harvester for and/or during discharge operations.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
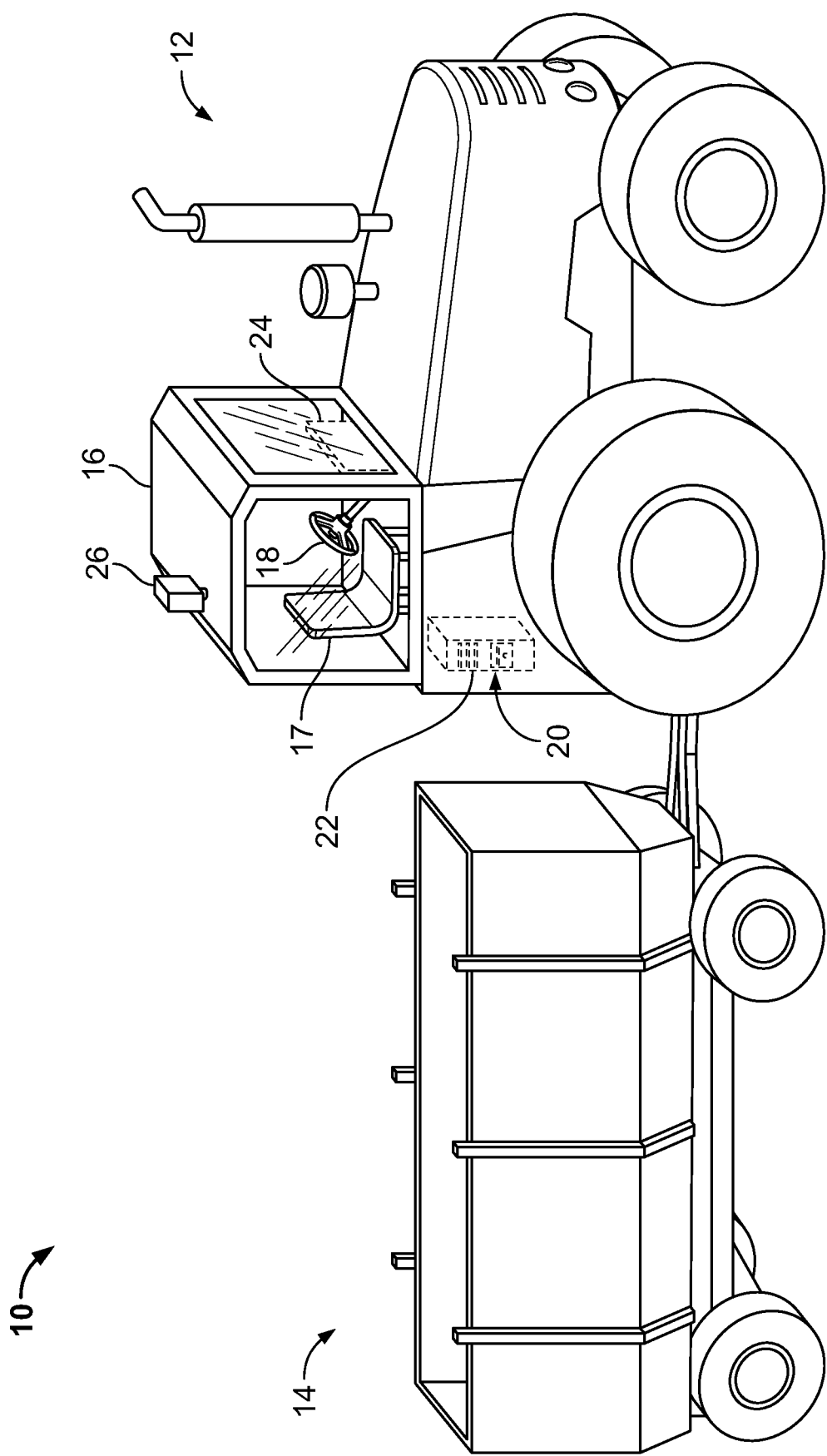
FIG. 1 is a side perspective view of an embodiment of a transport vehicle according to the present disclosure.

FIG. 1 shows an embodiment of a transport vehicle 10 according to the disclosure. The transport vehicle 10 includes a traction device 12 and a loading receptacle 14. In this exemplary embodiment, the fraction device 12 is a tractor, however, in other embodiments, the fraction vehicle 12 may be a truck or other self-propelled vehicle sufficient to transport loading receptacle 14. The loading receptacle 14 may be a grain cart, bin, wagon or other similar storage/transport vehicle. In this exemplary embodiment, the loading receptacle 14 is wagon. In another embodiment, the transport vehicle 10 may be a truck semi-trailer truck, tractor-trailer or other similar self-propelled container vehicle.

The tractor 12 includes a cab 16. The cab 16 includes an operator seat 17 and operator controls 18 including, but not limited to steering and speed controls. The tractor 12 further includes a control system 20. The control system 20 includes a microprocessor 22, a database (not shown), a display device 24, and an imaging device 26 mounted on or attached to the tractor 12. The imaging device 26 may be a digital or analog camera and/or image recording device. The display device 24 displays control data, including positioning commands to the operator 12 of the tractor. In another embodiment, the video camera 26 may be mounted on or attached to the transport vehicle 10 at any position, for example, but not limited to the roof or mirror, sufficient to provide a field of view for a range of predetermined harvester acquisition positions. The video camera 26 may provide video data to the microprocessor via a wire or wireless connection. The control system 20 may further include an operator data entry device, such as a keyboard or touch screen, for entering commands to the control system 20.

In another embodiment, two or more video cameras 26 may be mounted on the transport vehicle 10. In this case, the two or more video cameras 26 may be used to obtain a useable image in case one or more of the video cameras 26 have a blocked or partially blocked view for the range of predetermined harvester acquisition positions of interest. In another embodiment, the images from the two or more video cameras 26 may be "stitched" together to provide increased image signal data. In yet another embodiment, the two or more video cameras 26 are used alternatively.

Figure 2:
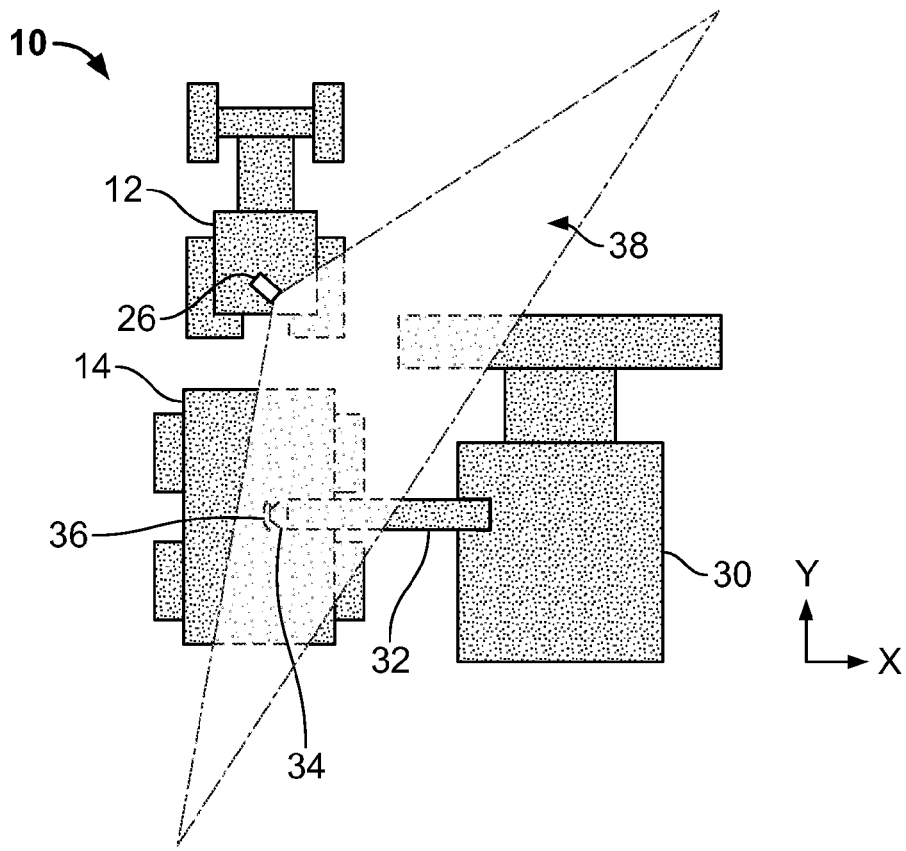
FIG. 2 is a top view of a transport vehicle and harvester during an unloading operation.

The video camera 26 provides image data to the microprocessor 22. The control system 20 automatically selects and analyzes the image data for a trackable feature or recognizable video object of the harvester 30 (FIG. 2) within the field of view of the video camera 26 by any of several know techniques. The trackable feature may be a target 36 (FIG. 2) placed on a surface of the harvester 30. As shown in FIG. 2, the target 36 is placed on the discharge outlet 34 (FIG. 2). In another embodiment, one or more targets 36 may be placed at one or more positions on the harvester 30. In one embodiment, the trackable feature may be a pattern, a portion of lettering, a structural element, or other feature. For example, the trackable feature may be a discharge outlet 34 (FIG. 2).

Referring again to FIG. 1, the microprocessor 22 is equipped with a computer program product including an algorithm embodied on a computer readable medium. The microprocessor, having been provided the image data, executes the computer program product to determine relative position location data of the recognizable video object. In one embodiment, the relative position location data of the recognizable video object is extrapolated to provide relative position data of the harvester. The relative position data may be provided to the transport vehicle operator.

The microprocessor may further execute the computer program product to determine position location instruction data, and to provide the position location instruction data to the transport vehicle operator. The position location instruction data may include current position and speed data with respect to the harvester 30. The position location instruction data may further include position correction commands to change the relative position of the transport vehicle 10 with respect to the harvester 30. In one embodiment, the position correction commands include instructions to change operational parameters of the transport vehicle 10 with respect to the harvester 30 so as to position the transport vehicle 10 in an acceptable known position relative to the harvester 30 for unloading operations. The operational parameters may include speed and/or direction of the transport vehicle 10.

In another embodiment, the control system 20 may include means to automatically adjust the position of the transport vehicle 10. In this embodiment, the control system 20 may include interface systems that interact with the power train and electronic systems of the transport vehicle 10 to automatically control operations of the transport vehicle, including, but not limited to speed and/or direction. The interface systems may include electronic and mechanical systems that interface with operational systems of the transport vehicle 10, such as, but not limited to speed control and steering control. In another embodiment, the control system 20 may include a manual override of the means to automatically adjust the position of the transport vehicle 10.

According to an exemplary embodiment of practicing a method of the present disclosure, the transport vehicle 10 is positioned in an acceptable known position relative to the harvester 30 for unloading operations. While in this relative position, which may be stationary or while the transport vehicle 10 and harvester are in motion, the operator of the transport vehicle 10 issues a command to the control system 20 for the video camera 26 to capture an image. The video image is downloaded to the microprocessor and provided to the control system database and identified by the microprocessor as an acceptable position for unloading, or in other words, a "GO" position. In one embodiment, the acceptable positioning for unloading data may include a plurality of positions, for example, a plurality of positions that allow the discharge device 32 to be located over a predetermined range of surface of the cart 14. In such a manner, a database of a plurality of acceptable positions may be constructed by capturing a plurality of images of acceptable discharge positions. In one embodiment, the database of "GO" positions is initially captured at the beginning of a discharge operation. In another embodiment, the database of "GO" positions has been previously entered into the database prior to a discharge operation. In one embodiment, the previously entered "GO" position database is associated with a specific harvester 30 or specific harvester make, model or configuration. In another embodiment, the previously entered "GO" position database is associated with a specific target position, for example, a specific discharge outlet position.

FIG. 2 illustrates a transport vehicle 10 and a harvester 30 during transfer of a crop (not shown) from the harvesting machine 30 to the transport vehicle 10 according to an embodiment of the present disclosure. In this exemplary embodiment, the harvester 30 is a combine harvester (combine), however, in other embodiments, the harvester 30 may be a forage harvester or other similar crop gathering machine. The harvester 30 includes a discharging device 32. The discharging device 32 includes a discharge outlet 34 for directing the discharge of the harvested crop into the cart 14 of the transport vehicle 10. The harvester 30 further includes a target 36 placed on the discharge outlet 34. In one embodiment, the transport vehicle 10 and the harvester 30 are moving or in motion. In another embodiment, the transport vehicle 10 and the harvester 30 are stationary.

As can be seen in FIG. 2, the target 36 is in the field of view (FOV) 38 of the video camera. As can be further seen in FIG. 2, the transport vehicle 10 is in an acceptable relative position, both in the X and Y directions, with the harvester 30 for discharge operations. In this position, the operator of the transport vehicle 10 would receive a "GO" condition command from the control system 20 (FIG. 1), indicating that transport vehicle 10 and harvester 30 are in a relative position acceptable for discharge operations. As can be appreciated from FIG. 2, relative movement of either the transport vehicle 10 or the harvester 30 in either the X or Y direction may take the discharge outlet 34 from a position that is acceptable for discharge operations, or in other words, from a position where grain discharged from the discharge outlet 34 will be collected in the cart 14. When the video camera 26 provides the control system 20 with an image that indicates the discharge device 32 is no longer in an acceptable position for discharge operations, the control system provides a "NO GO" condition command to the operator of the transport vehicle 10, and provides corrective positioning commands to the operator to bring the transport vehicle 10 back into an acceptable position for discharge operations, at which time the operator will receive a "GO" command.

Figure 3:
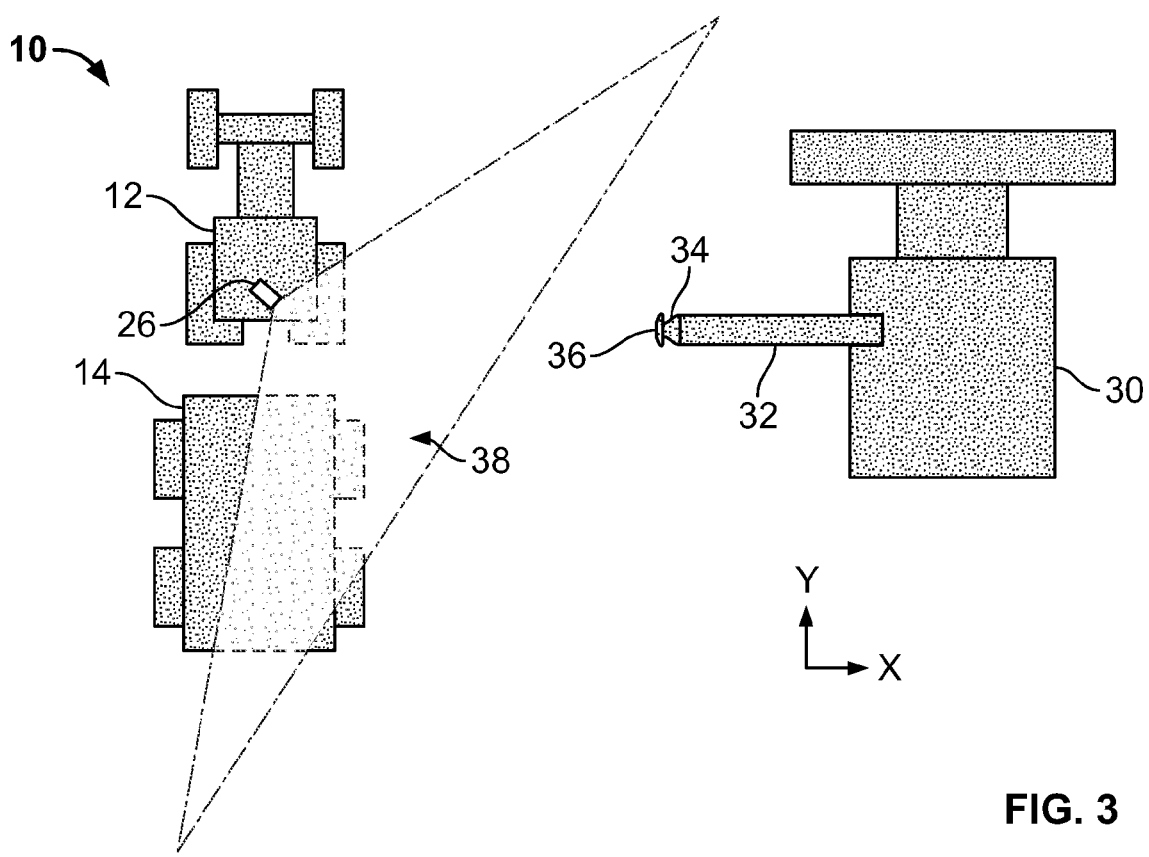
FIG. 3 is a top view of a transport vehicle approaching a harvester for an unloading operation.

FIG. 3 shows the transport vehicle 10 and the harvester 30 is a relative "NO GO" position. For example, the transport vehicle 10 may be first approaching the harvester 30 for a discharge operation. As can be seen in FIG. 3, the operator of the transport vehicle 10 has moved the transport vehicle 10 to a first position where the harvester 30, and in this case, the target 36, first falls within the FOV 38 of the video camera 26. The control system 20 receives image data from the video camera 26, and determines the corrective positioning commands to bring the transport vehicle 10 into a "GO" position relative with the harvester 30. These commands may include, but are not limited to corrective positioning in both the X and Y directions, and corrective speed commands. In one embodiment, the transport vehicle 10 and the harvester 30 are moving or in motion. In another embodiment, the harvester 30 is stationary.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for positioning a transport vehicle relative to a harvester for discharge operations, comprising:
    an imaging device for generating an image signal; and
    a microprocessor for processing the image signal and generating position command data wherein the microprocessor comprises a database containing digital images identified as acceptable for discharge operations and is configured to generate position command data based on comparing said image signal with images from said database;
    wherein the position command data comprises command instructions for the transport vehicle.

2. The control system of claim 1, wherein the command instructions are proposed to an operator of the transport vehicle.

3. The control system of claim 1, wherein the position command data includes corrective positioning commands to position the transport vehicle relative to the harvester.

4. The control system of clam 1, wherein the control system automatically selects and analyzes the image signal for a trackable feature or recognizable video object of the harvester.

5. The control system of claim 4, wherein the trackable feature is a discharge outlet of the harvester or a target placed on the discharge outlet of the harvester.

6. A transport vehicle for receiving a discharged crop from a harvester, comprising:
    an imaging device for generating an image signal; and
    a microprocessor for processing the image signal and generating position command data;
    wherein the position command data comprises command instructions for the transport vehicle; and
    wherein the microprocessor comprises a data base containing digital images identified as acceptable for discharge operations and a computer program product embodied on a computer readable medium, the microprocessor configured compare said image signal with Images from said database and generate position command data for positioning.

7. The transport vehicle of claim 6, wherein the command instructions are provided to an operator of the transport vehicle.

8. The transport vehicle of claim 6, wherein the position command data includes corrective positioning commands to position the transport vehicle relative to the harvester.

9. The transport vehicle of claim 6, wherein a control system automatically selects and analyzes the image signal for a trackable feature or recognizable video object and the trackable feature is an external portion of the harvester.

10. The transport vehicle of claim 8, wherein the database comprises a plurality of relative positions acceptable for discharge operations.

11. A method of positioning a transport vehicle and a harvester for unloading operations, comprising:
    generating a database of acceptable relative positions between the transport vehicle and the harvester;
    capturing video images with an imaging device of the relative position of the harvester;
    comparing the captured video images to the data base of acceptable relative positions with a control system; and
    generating position commands with the control system to position the transport vehicle in an acceptable relative position with the harvester for discharge operations wherein the control system is configured to use an algorithm to determine the relative position location data of a trackable feature or video object of the harvester to determine relative position data of the harvester; and
    wherein the database of acceptable relative positions is generated at the initiation of or prior to the initiation of a discharge operation by capturing the images of a plurality of images of acceptable discharge positions.

12. The method of claim 11, further comprising the step of automatically selecting or analyzing the video image for the trackable feature of recognizable video object.

13. The method of claim 11, wherein the video images are captured by a video camera mounted on the transport vehicle.

14. The method of claim 11, wherein the position commands comprise position and speed correction commands.

15. The method of claim 11, wherein the position commands are generated to relatively position the transport vehicle and harvester in a range of predetermined acceptable discharge position stored in the data base.

16. The method of claim 11, wherein the position commands are generated to relatively position the transport vehicle and harvester in a range of predetermined acceptable discharge position while the harvester is stationary.

17. The method of claim 11, wherein the position commands are proposed to an operator of the manned transport vehicle.

18. The method of claim 11, further comprising providing a "NO GO" warning to a transport vehicle operator when the capturing video images of the relative position of the harvester are outside of the database of acceptable relative positions.

19. The method of claim 11, wherein the-trackable feature is a discharge outlet of the harvester or a target placed on the discharge outlet of the harvester.

* * * * *